US008199387B1

(12) United States Patent
Aye et al.

(10) Patent No.: US 8,199,387 B1
(45) Date of Patent: Jun. 12, 2012

(54) PHASE ADDRESSED HOLOGRAPHIC ASSOCIATIVE MEMORY

(75) Inventors: Tin Maung Aye, Mission Viejo, CA (US); Tomasz Jannson, Torrance, CA (US); Andrew Kostrzewski, Garden Grove, CA (US); Min-Yi Shih, Redondo Beach, CA (US)

(73) Assignee: Physical Optics Corporation, Torrance, CA (US)

( * ) Notice: Subject to any disclaimer, the term of this patent is extended or adjusted under 35 U.S.C. 154(b) by 427 days.

(21) Appl. No.: 12/559,416

(22) Filed: Sep. 14, 2009

(51) Int. Cl.
*G03H 1/12* (2006.01)
*G03H 1/26* (2006.01)
*G11B 7/00* (2006.01)

(52) U.S. Cl. .............. 359/11; 359/22; 369/103
(58) Field of Classification Search .............. 359/11, 359/22, 24; 369/103
See application file for complete search history.

(56) References Cited

U.S. PATENT DOCUMENTS

| 3,506,327 | A | 4/1970 | Leith et al. |
| 3,612,641 | A | 10/1971 | Eaglesfield et al. |
| 5,555,108 | A | 9/1996 | Babbitt et al. |
| 5,627,664 | A | 5/1997 | Trisnadi |
| 5,719,691 | A | 2/1998 | Curtis et al. |
| 5,940,514 | A | 8/1999 | Heanue et al. |
| 5,943,145 | A | 8/1999 | Curtis et al. |
| 6,281,993 | B1 | 8/2001 | Bernal et al. |
| 6,674,555 | B1 | 1/2004 | Curtis et al. |
| 6,697,180 | B1 | 2/2004 | Wilson et al. |
| 6,909,529 | B2 | 6/2005 | Curtis |
| 7,149,014 | B2 | 12/2006 | Chao et al. |
| 7,209,270 | B2 | 4/2007 | Curtis |
| 7,554,706 | B2 | 6/2009 | Tsukagoshi et al. |
| 7,787,165 | B2 * | 8/2010 | Chao ................. 359/24 |
| 2003/0095477 | A1 * | 5/2003 | Horimai et al. ....... 369/13.28 |

OTHER PUBLICATIONS

Yeh-Wei Yu, Point Spread Function by Random Phase Reference in Collinear Holographic Storage, Feb. 2009/vol. 48(2).
Michael W. Halle, Multiple Viewpoint Rendering for Three-Dimensional Displays, Jun. 1997, pp. 1-164, Massachusetts Institute of Technology 1997.
Michael W. Halle, The Generalization Holographic Stereogram, pp. 1-134, 1991 Massachusetts Institute of Technology, Document last updated Feb. 24, 1993.
Yuri Denisyuk, Properties and Applications of Deep Three-Dimensional Holograms, SPIE vol. 1183 Holography '89, pp. 1-27.

* cited by examiner

*Primary Examiner* — Alessandro Amari
(74) *Attorney, Agent, or Firm* — Sheppard Mullin Richter & Hampton LLP

(57) ABSTRACT

The present invention provides a holographic storage apparatus comprising a polarizing beam splitter configured to split an incoming beam into an object beam and a reference beam; a first spatial light modulator configured to modulate the object beam with an array of data; a second spatial light modulator configured to phase modulate the reference beam with an orthogonal phase function; a holographic medium configured to record an interference pattern between the modulated object beam and the modulated reference beam; a first image sensor configured to read an image of the modulated object beam; and a second image sensor configured to read an image of the modulated reference beam.

20 Claims, 8 Drawing Sheets

PHASE ADDRESSED HOLOGRAPHIC ASSOCIATIVE MEMORY

TECHNICAL FIELD

The present invention relates generally to data storage, and more particularly, some embodiments relate to phase addressed holographic memory.

DESCRIPTION OF THE RELATED ART

The development of Holography was pioneered in the mid 20th century by physicist Dennis Gabor, who ultimately received a Nobel Prize in Physics for his achievements. The advent of the laser in 1960 allowed advances used in modern holographic techniques. The first holograms that recorded 3D objects were made in 1962 by Yuri Denisyuk in the Soviet Union, and by Emmett Leith and Juris Upatnieks at the University of Michigan, in the United States of America.

FIG. 1 is a diagram illustrating a simple example of a conventional holographic technique. Referring now to FIG. 1, in this example the collimated laser light beam 102 is provided for the holographic process. This beam can be provided, for example, by a laser light source. The beam splitter 104 splits the beam into 2 components to achieve an object beam 105 and a reference beam 107. As illustrated in FIG. 1, object beam 105 impinges on an object 108 to be imaged. Light 103 reflected by object 108 impinges on a recording medium 109. Reference beam 107 is folded by a folding mirror 106 onto recording medium 109. The interference between reference beam 107 and object beam 103 results in a pattern of varying intensity that is captured by recording medium 109.

Once the pattern is captured or recording medium 109, it can be recovered by illuminating the recording medium 109 with a reproduction of the original reference beam 107. In other words, the light field diffracted by the reference beam impinging on recording medium 109 is identical to the light field that was originally scattered by the object 108 that was imaged. Various materials can be used for recording medium 109 including, for example, photographic film, photoresists, photo polymers, and so on.

Holography, however, is not limited to applications of a photographic nature. Indeed, with the ever-increasing demand for high data-storage capacities in small volumes, developers have turned to holography as a mechanism for achieving high-density data storage. Configurations similar to that shown in FIG. 1 can be utilized to achieve high-density, high-speed data storage through holographic techniques. For example, high-density high-speed holographic memory has been proposed for a variety of storage applications. High-density high-speed holographic memory technologies have been developed for onboard storage for both weapons and test instrumentation systems. One example system uses electro-optic beam-steering technology to provide 2-D recording. Using this technology, two one-dimensional beam-steering spatial light modulators can be cascaded in orthogonal configuration to arrive at a 2-dimensional angular-fractal multiplexing scheme for 2-D recording. An example of using a beam steering spatial light modulator for holographic recording is described in U.S. Pat. No. 7,149,014, which is incorporated herein by reference in its entirety.

To increase recording density, light models of 2-dimensional Walsh functions have been used in either or both of the object and reference fields to achieve deep 3-D holographic recording. In such a configuration, different objects, can be recorded on a hologram so that each of them is recorded with one of the Walsh function reference beams. Accordingly, on reading the hologram using one of the Walsh functions, the object recorded with that Walsh function can be reconstructed. Examples of using Walsh functions to achieve multiplexed recording is described in U.S. Pat. Nos. 5,940,514, and 5,627,664, which are incorporated herein by reference in its entirety.

BRIEF SUMMARY OF EMBODIMENTS OF THE INVENTION

According to various embodiments of the invention, systems and methods are provided for holographic data storage. In particular, in accordance with some embodiments of the invention, orthogonal functions are combined with two-dimensional holographic recording to achieve 3 dimensional recording in a holographic medium. In one implementation, a 2-dimensional spatial light modulator is used to allow imaging of a 2-dimensional array or "page" of data on a holographic medium. This can be combined with a 2nd 2-dimensional spatial light modulator to implement orthogonal function such as, for example, a Walsh function, to achieve 3-dimensional recording of multiple pages from the 2-dimensional spatial light modulator.

Cubic beam splitters can be used in conjunction with two-dimensional spatial light modulators to direct the object and reference beams onto a recording medium such as a photo refractive crystal. Image sensors such as, for example, CCD or CMOS image sensors can be used to capture images recorded on the holographic medium for readout, transfer, image processing, or other purposes.

Although the holographic memory can be used in the number of environments or applications and built to a wide array of varying specifications, in one application a holographic memory can be used for advanced massive onboard data storage for satellites, aircraft, weapons systems, and other applications. Applications of the holographic memory are not limited to onboard data storage and can be used in other environments as well. Depending on the materials and configuration selected and implemented, high capacities of 16 terabytes or greater can be achieved with a low volume and weight, as low as 100 cm cubed, 500 g, for example, and some applications may approach a petabyte capacity in a 1 cubic cm recording medium. Likewise, some implementations may achieve high survivability-on the order of 35 to 50 G.

Embodiments of the invention can be implemented utilizing a non-scanning, orthogonal binary phase reference beam to address a 3-dimensional holographic memory for data recording and retrieval operations.

According to an embodiment of the invention, a holographic storage apparatus comprises a polarizing beam splitter configured to split an incoming beam into an object beam and a reference beam; a first spatial light modulator configured to modulate the object beam with an array of data; a second spatial light modulator configured to phase modulate the reference beam with an orthogonal phase function; a holographic medium configured to record an interference pattern between the modulated object beam and the modulated reference beam; a first image sensor configured to read an image of the modulated object beam; and a second image sensor configured to read an image of the modulated reference beam.

Other features and aspects of the invention will become apparent from the following detailed description, taken in conjunction with the accompanying drawings, which illustrate, by way of example, the features in accordance with embodiments of the invention. The summary is not intended to limit the scope of the invention, which is defined solely by the claims attached hereto.

BRIEF DESCRIPTION OF THE DRAWINGS

The present invention, in accordance with one or more various embodiments, is described in detail with reference to the following figures. The drawings are provided for purposes of illustration only and merely depict typical or example embodiments of the invention. These drawings are provided to facilitate the reader's understanding of the invention and shall not be considered limiting of the breadth, scope, or applicability of the invention. It should be noted that for clarity and ease of illustration these drawings are not necessarily made to scale.

The figures are not intended to be exhaustive or to limit the invention to the precise form disclosed. It should be understood that the invention can be practiced with modification and alteration, and that the invention be limited only by the claims and the equivalents thereof.

DETAILED DESCRIPTION OF THE EMBODIMENTS OF THE INVENTION

The present invention is directed toward a system and method for providing a management system for holographic data storage. In particular, in accordance with some embodiments of the invention, orthogonal function reference beams are combined with two-dimensional holographic recording to achieve three-dimensional recording in a holographic medium. In one implementation, a 2-dimensional spatial light modulator is used to allow imaging of a 2-dimensional page of data on a holographic medium. This can be combined with a 2nd 2-dimensional spatial light modulator to apply in orthogonal phase function such as, for example, a Walsh function, to achieve 3-dimensional recording of multiple pages from the 2-dimensional spatial light modulator.

From time-to-time, the present invention is described herein in terms of example embodiments, environments and applications. Description in terms of these embodiments, environments and applications is provided to allow the various features and embodiments of the invention to be portrayed in the context of an exemplary scenarios. After reading this description, it will become apparent to one of ordinary skill in the art how the invention can be implemented in different and alternative embodiments, environments and applications.

Figure 1:
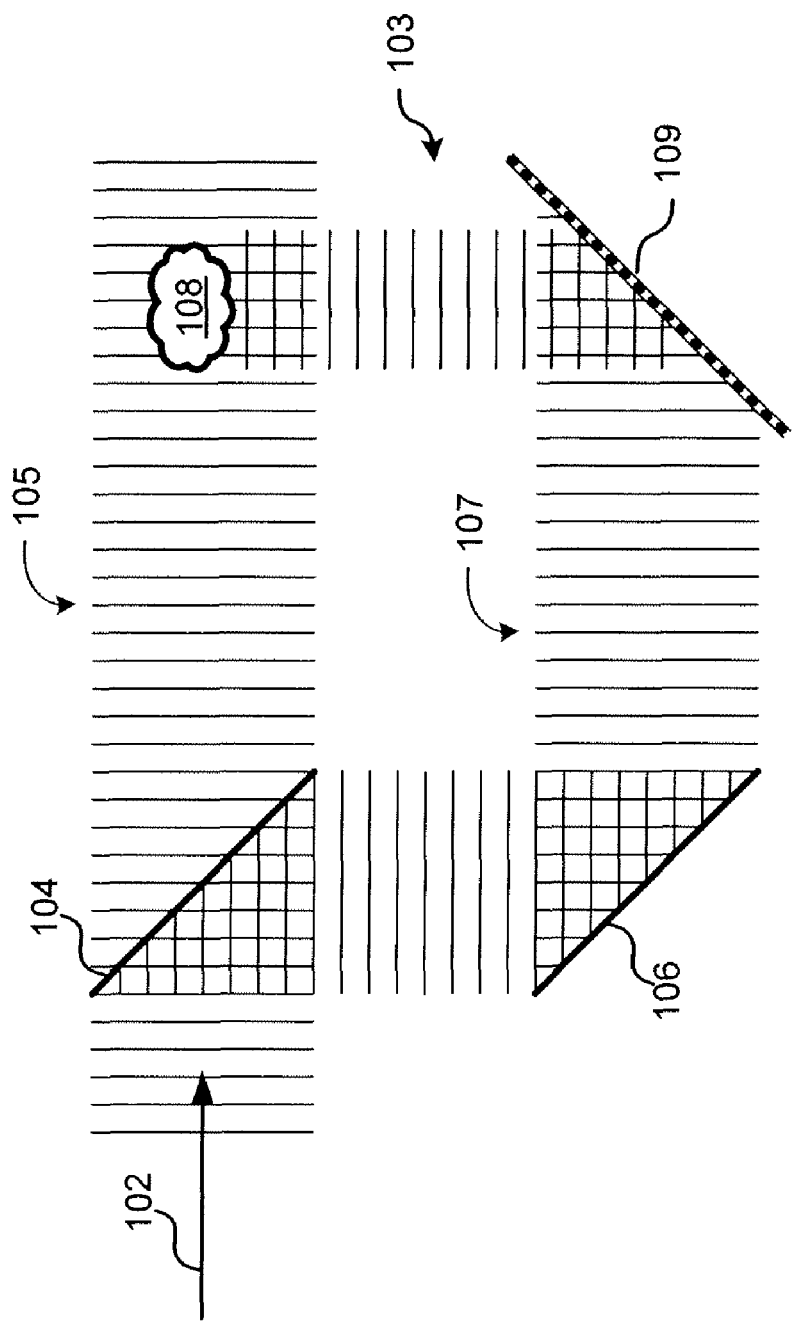
FIG. 1 is a diagram illustrating a simple example of a conventional holographic technique.
Figure 2:
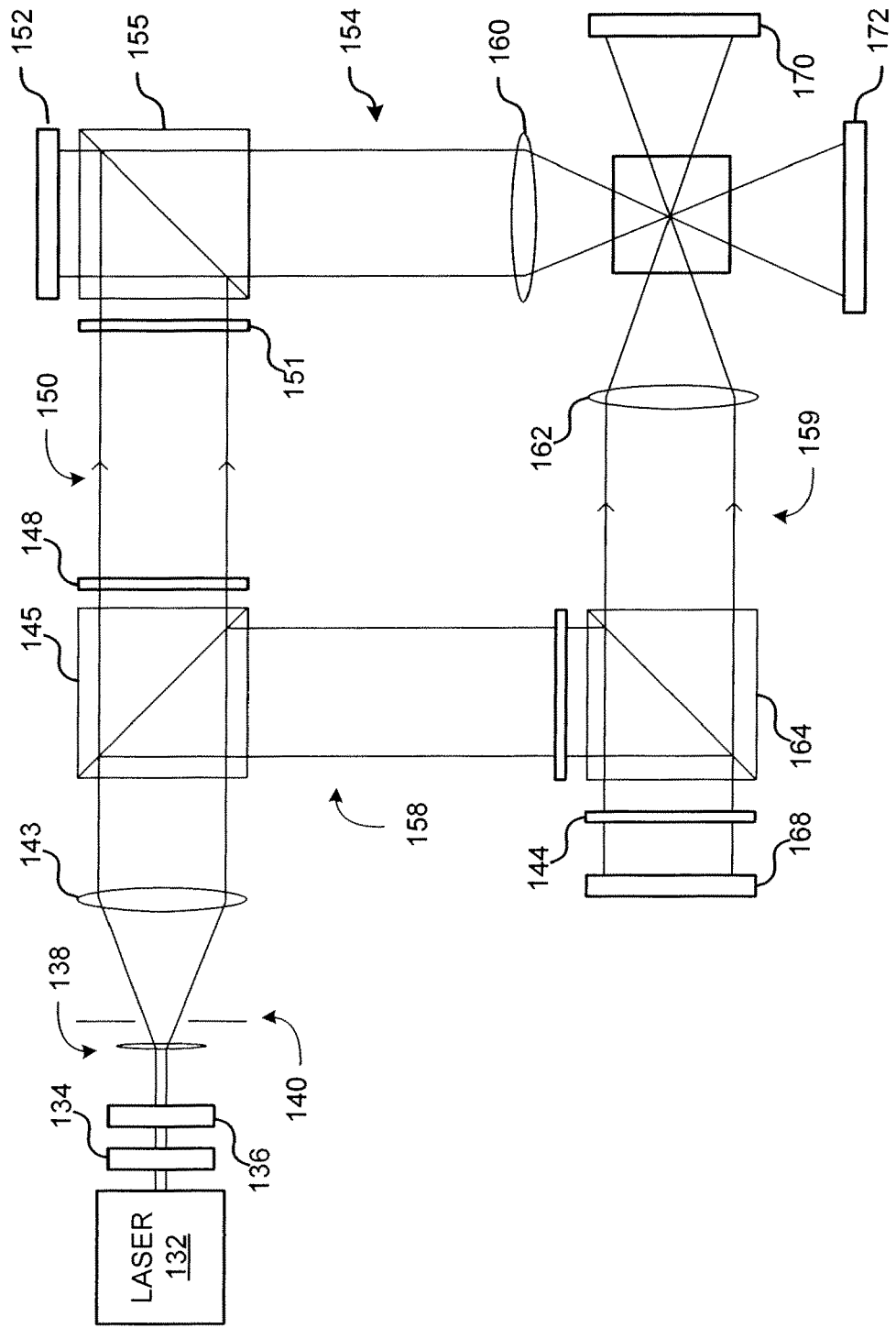
FIG. 2 is a diagram illustrating an example holographic recording system in accordance with one embodiment of the invention.

FIG. 2 is a diagram illustrating an example holographic recording system in accordance with one embodiment of the invention. Referring now to FIG. 2, a laser 132 is provided to generate a coherent beam of light, which is used to create the object beam 150 and the reference beam 158. In one embodiment, a compact diode-pumped solid-state 532 nm Nd:YAG laser with feedback control to maintain wavelength and power stability and with intensity level control can be used. In this example implementation, a half wave plate 134 is provided to control the polarization of the laser light.

The half wave plate can be manually controlled or an electronically controlled (for example computer-controlled) half wave plate can be used to allow remote or electronic adjustment. Half wave plate 134 may be used to control the relative power between the object beam 150 and the reference beam 158. As described below, object beam 150 is formed by transmission of an incoming beam through polarizing beam splitter 145, while reference beam 158 is formed by reflection off of polarizing beam splitter 145. Accordingly, by adjusting the polarity of the incoming beam using half wave plate 134, the intensity—and therefore the power—of the two beams may be adjusted. In further embodiments, the half wave plate 134 may be used during data reading operations. As described herein, data retrieval may comprise two operations. In the first operation, a reference beam used to record a particular data page is determined by transmitting a partially modulated object beam through holographic medium 169. In the second operation, the determined reference beam is transmitted through the holographic medium 169 to retrieve the entire data page. Accordingly, at any given step during this retrieval operation, only one beam is required. The half wave plate 134 may therefore be used to provide these single beams. When an object beam is needed (for reference reconstruction), the half wave plate 134 may be used to adjust the incoming polarity for total transmission through the polarizing beam splitter 145. When a reference beam is needed (for data page retrieval), the half wave plate 134 may be used to adjust the incoming polarity for total reflection by the polarizing beam splitter 145.

A shutter 136 is also provided in the illustrated example to allow exposure to be controlled and the beam to be momentarily suspended from read/write operations without the need to power the laser 132 up and down. This can be useful, for example, to update spatial light modulators 152, 168, between pages of data.

Objective lens 138 can be provided along with a spatial filter 140 to achieve the desired beam filtering. A collimating lens 143 provides a collimated beam for object beam 150 and reference beam 158. Polarizing beam splitter 145 splits the collimated beam into object beam 150 and reference beam 158. Particularly, polarizing beam splitter 145 transmits object beam 150 at a 1st polarization, and reflects reference beam 158 at a 2nd polarization. Adjusting half wave plate 134 alters the polarity of the light beam, which can be useful for adjusting the relative energy of the transmitted and reflected beams at polarizing beam splitter 145.

In the illustrated example, object beam 150 passes through shutter 148 and half wave plate 151 before reaching polarizing beam splitter 155. Polarizing beam splitter 155 directs the object beam 150 to spatial light modulator 152. Half wave plate 151 can be used to adjust the polarization of object beam 150 to optimize reflection at polarizing beam splitter 155 according to the desired system parameters. For example, inherent characteristics of spatial light modulator 152 may introduce a polarization rotation in object beam 150. Half wave plate 151 can compensate for this rotation by pre-rotating the polarization of object beam 150 in the opposite direction as the spatial light modulator 152. Spatial light modulator 152 modulates reflected object beam 152 creating amplitude modulated object beam 154 and directs modulated object beam 154 toward holographic recording medium 169. Polarizing beam splitter 155 is configured to transmit waves that are polarized orthogonally to the optical plane and to reflect waves having that are polarized along the optical plan in the direction transmitted by polarizing beam splitter 145. Accordingly, the entire object beam 150 is first reflected onto spatial light modulator 152 and then transmitted such that it is orthogonal to the optical plane when incident on the holographic medium 169.

A lens 160 is included to focus the pixels from spatial light modulator 152 onto the corresponding location on the data CMOS or CCD sensor array 172. In one embodiment, holographic recording medium 169 is implemented using a thick or volume holographic medium such as for example an Fe:LiNbO$_3$ crystal holographic recording material, although other photorefractive crystals or recording materials can be used. Thick photopolymer recording materials can be used for 90° recording with high Bragg selectivity. The specific polymerization process of these materials can be optimized in various embodiments for low scatter in a thick volume of photopolymer medium. Thick recording materials generally have a thickness greater than a wavelength or two of that of the object and reference beams.

Reference beam 158 is directed through shutter 149 and reflected by polarizing beam splitter 164 onto phase-only spatial light modulator 168 after passing through half wave plate 144. Phase spatial light modulator 168 is used to modulate reference beam 158 with an orthogonal function such as, for example, a Walsh function or other orthogonal function. The modulated reference beam 159, after passing back through the half wave plate 144 is directed through polarizing beam splitter 164 and focused by a lens 162 onto holographic recording medium 169. Polarizing beam splitter 164 is configured to transmit waves that are polarized orthogonally to the optical plane and to reflect waves having that are polarized in the direction reflected by polarizing beam splitter 145. Accordingly, the entire reference beam 158 is first reflected onto spatial light modulator 168 and then transmitted such that it is orthogonal to the optical plane when incident on the holographic medium 169. Because both the reference beam 159 and object beam 154 are in parallel polarization orthogonally to the optical plane, internal Brewster Bragg effects are avoided, thereby increasing the efficiency of the holograms, and resolution and storage capacity of the holographic medium 169.

Figure 3B:
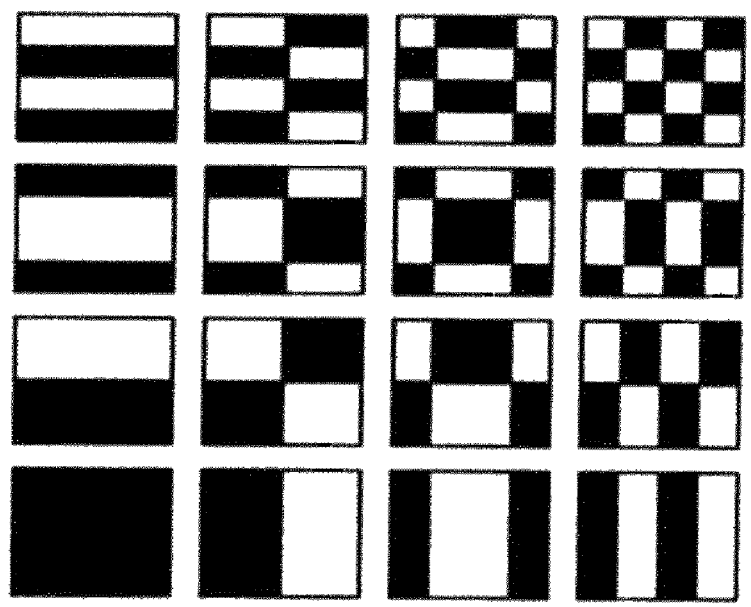
FIG. 3B illustrates an example for generating an orthogonal function optically by using a commercially available phase-only spatial light modulator in accordance with one embodiment of the invention.
Figure 3A:
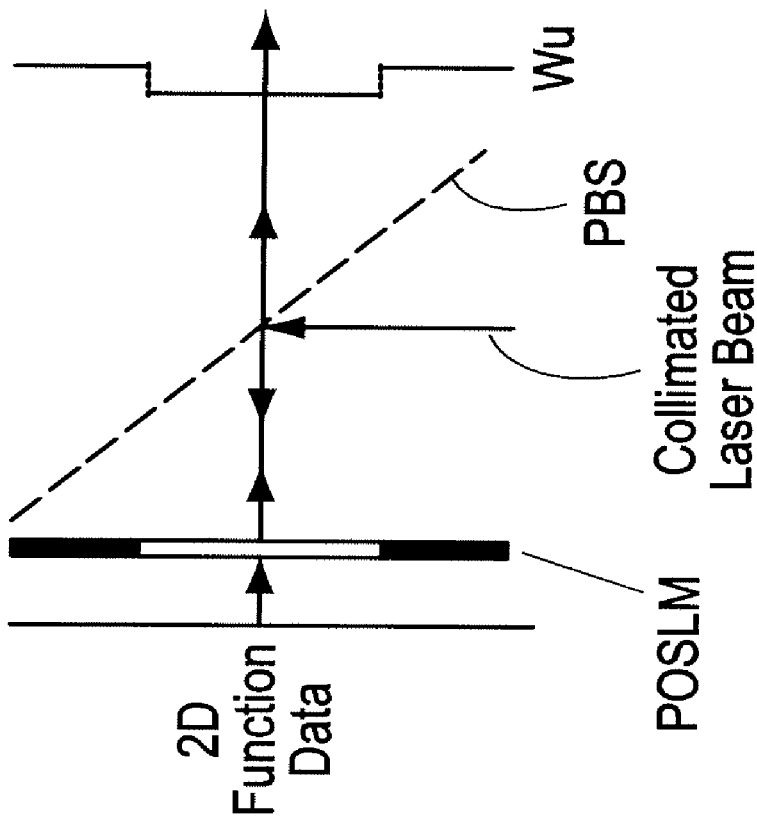
FIG. 3A illustrates an example set of orthogonal binary phase patterns (Walsh functions, in this example).

Modulating reference beam 158 with an orthogonal function such as a Walsh function allows multiple object images from object spatial light modulator 152 to be recorded onto holographic recording medium 169. Because the Walsh function modulates the reference beam with an orthogonal pattern, multiple images or pages of data can be recorded, and each image retrieved using a reference beam modulated with its associated orthogonal pattern. FIG. 3A is a diagram illustrating just one example of 16 frames of an orthogonal Walsh function that can be used to modulate the reference beam 158. In various embodiments, geometry of the binary phase patterns for the orthogonal function can be determined based on a tradeoff between the correlation signal and readout data page signal.

CCD, CMOS or other image sensors 170, 172 can be used for data and reference image retrieval and readout. Images can be captured by image sensors 170, 172 in real time as data is being recorded or when an image is being retrieved. Image sensors 170, 172 can be interfaced with image processing and capture electronics to capture retrieved images. Commercially available high-resolution (>1024×1024) high-speed CCD or CMOS image sensors can be used for correlation signal and data page readout. CCD modules with thermoelectric (TE) cooling are preferable for enhanced sensitivity and speed. A high-speed frame-grabber can be included to interface to a PC or other computing system for further image capture, transfer and processing. For example, connections such as, for example, IEEE 1394 (FireWire) and SATA II connections can be used.

In the illustrated example, hologram multiplexing and addressing are performed using collinear reference beams, which form an orthogonal set of binary phase-encoded 2D array patterns, where the number of orthogonal patterns, N, can be very large (for an n×n array, $N=n!/((n/2)!)^2$). Therefore, multiplexibility is greatly increased. In such embodiments, multiplexibility theoretically needs to only be limited by the maximum achievable index modulation of the recording material. In these examples, the hologram is recorded as the spatial interference pattern between a binary phase-encoded reference beam from phase spatial light modulator and an object beam from the data spatial light modulator. The data on the data spatial light modulator represents a 2D bit-map ("page") of data. Such recording can be repeated at the same location, i.e., multiplexed, by using other binary-phase patterns belonging to the same orthogonal set. As an example, using a phase spatial light modulator with 32×32 pixels (i.e., n=32), there are $N=32!/(16!)^2=6\times10^8$, number of holograms. Assuming a 1024×1024 pixel data page (or 1 Megapixel data spatial light modulator), with the 32×32 pixel phase spatial light modulator, a data capacity of $6\times10^{14}$ bits or 600 Tbits (75 Tbytes) can be achieved in a 1 cm$^3$ crystal.

Example embodiments with phase-encoded 2D reference beam and parallel holographic correlation search method can be implemented to avoid strict limitations on the number of recorded holograms, and can be implemented to access hundreds of terabits of stored data in milliseconds. The example embodiment illustrated herein uses a symmetric 90° recording and retrieving geometry and parallel holographic correlation search. Such designs can be implemented without requiring any movement of the recording medium. The unique 90° holographic recording geometry can also aid in achieving higher capacity, since it allows optimal filtering of the noise signal and provides a high signal-to-noise ratio in the holograms (limited only by the pixel contrast ratio of the data spatial light modulator and CMOS/CCD).

Additionally, the highly parallel holographic associative search with a partial image data key (i.e., context addressing mode) allows simultaneous retrieval of correlated signals corresponding to possible data pages of which the key forms a part. In this case, the correlation signals can be processed by real-time software to identify the right data image and retrieve the full data page from memory in a few milliseconds. For example, a portion of a page of data can be used to recreate or identify the phase pattern that was used to modulate the reference beam. With the particular orthogonal function identified, the page of memory to which the data segment belongs can then be identified, and the data retrieved.

With a 1024×1024 pixel data page with an update speed of 10 kHz, achievable with current spatial light modulators (SLMs) such as the Texas Instruments Digital Micromirror Device (DMD), a data transfer rate of 10 gigabit/s is achievable.

Figure 4:
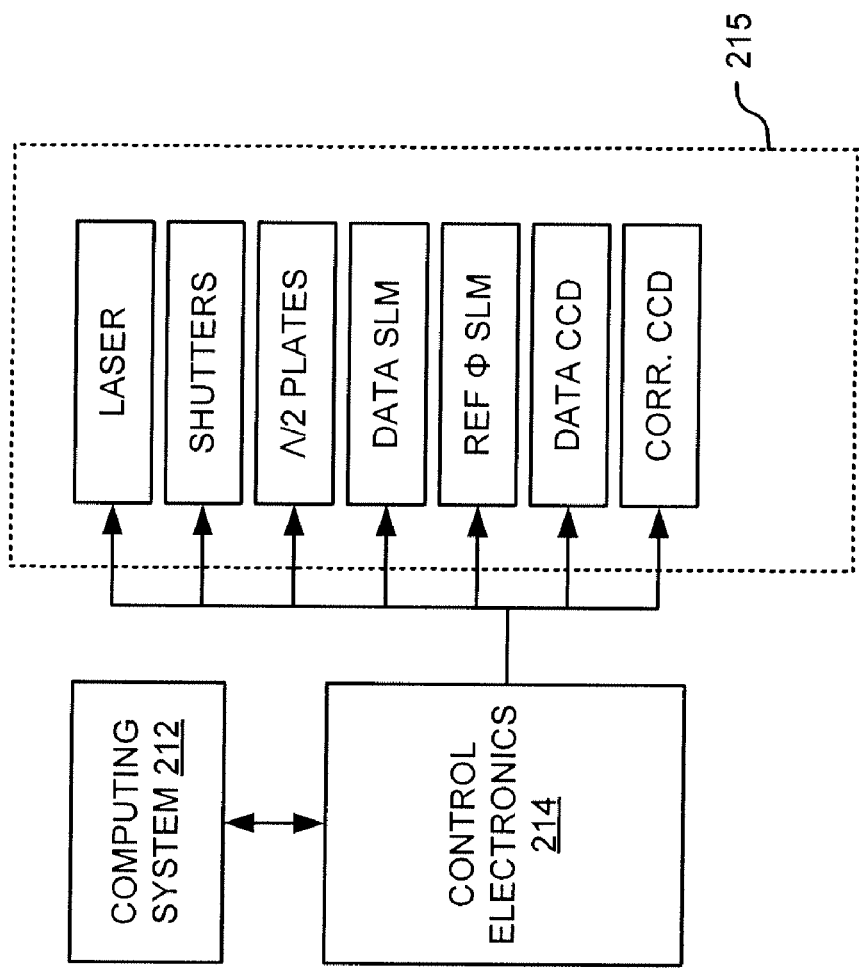
FIG. 4 is a high-level block diagram illustrating a control system for controlling a holographic recording system such as that described herein.

As stated above, the holographic recording system can be integrated with a computing system for image retrieval, readout, analysis, and other image operations. As also stated above, operation of the holographic recording system can be controlled by computing system. This can be the same computing system used for image processing, or separate computer control can be provided. FIG. 4 is a high-level block diagram illustrating a control system for controlling a holographic recording system such as that described herein. Referring now to FIG. 4, the illustrated example includes a computing system 212 that is used to control control electronics 214. Computing system 212 can be implemented using any of a number of computing systems or control modules including, for example, a personal computing system configured to interface to control electronics 214. Likewise, computing system 212 and control electronics 214 can be implemented utilizing a dedicated control system. Control electronics 214 in the illustrated example includes electronics utilized to actuate a plurality of drivers 215 to control componentry such as a laser, shutters, half wave plates, spatial light modulators, image capture devices, and so on. Thus, a control system like computing system 212 can be used to coordinate shutter operations with the refresh of the data in phase spatial light modulators for example.

Figure 5:
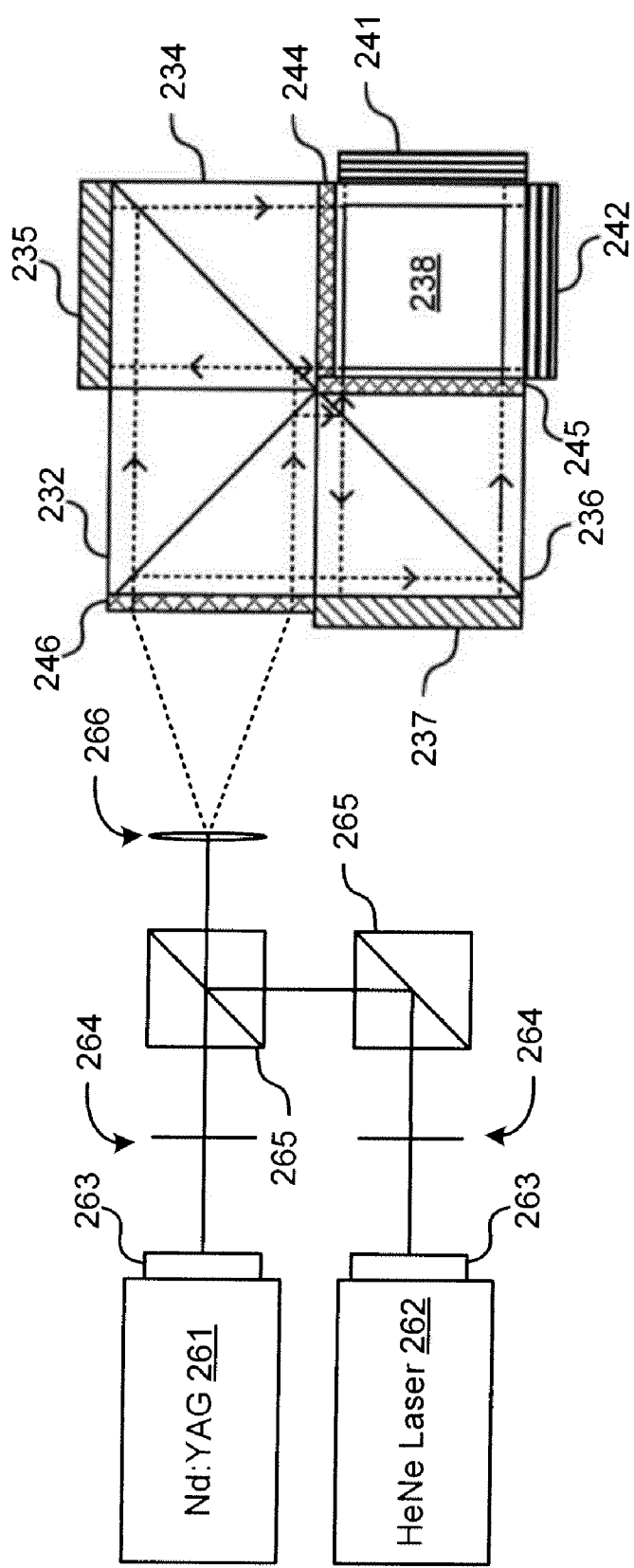
FIG. 5 is a diagram illustrating another example implementation of a holographic recording system in accordance with one embodiment of the invention.

FIG. 5 is a diagram illustrating another example implementation of a holographic recording system in accordance with one embodiment of the invention. Referring now to FIG. 5, this example illustrates a 90° configuration similar to that shown in the example of FIG. 2. However, in this example, the polarization beam splitters 232, 234, 236 and the holographic recording medium 238 are shown in a more tightly packed configuration along with spatial light modulators 235, 237 CCDs 241, 242, and lenses 244, 245, 246. Also shown are a Nd:YAG (Neodymium:Yttrium, Aluminum Garnet) laser 261 and/or a helium neon (HeNe) laser 262 coupled through half wave plates 263, shutters 264, and polarizing beam splitters 265 through a lens 266 to generate the object and reference beams. In this example configuration, the laser can be selected based on the type of crystal employed. In one embodiment, the polarizing beam splitters 232, 234, 236 are cubic configuration such that when they are stumbled with a cube of photo refractive crystal used for the holographic recording medium, the system can be packaged and contained in a confined cubic arrangement. Examples of this are discussed in more detail below with reference to FIGS. 6 and 7.

In various embodiments, such as system can be configured in a compact high density cubic memory system. The data storage system can use nonscanning, orthogonal binary phase reference beam to address the memory for recording and retrieval purposes, and the use of orthogonal functions can be employed to provide three-dimensional (3D) holographic memory.

Figure 6:
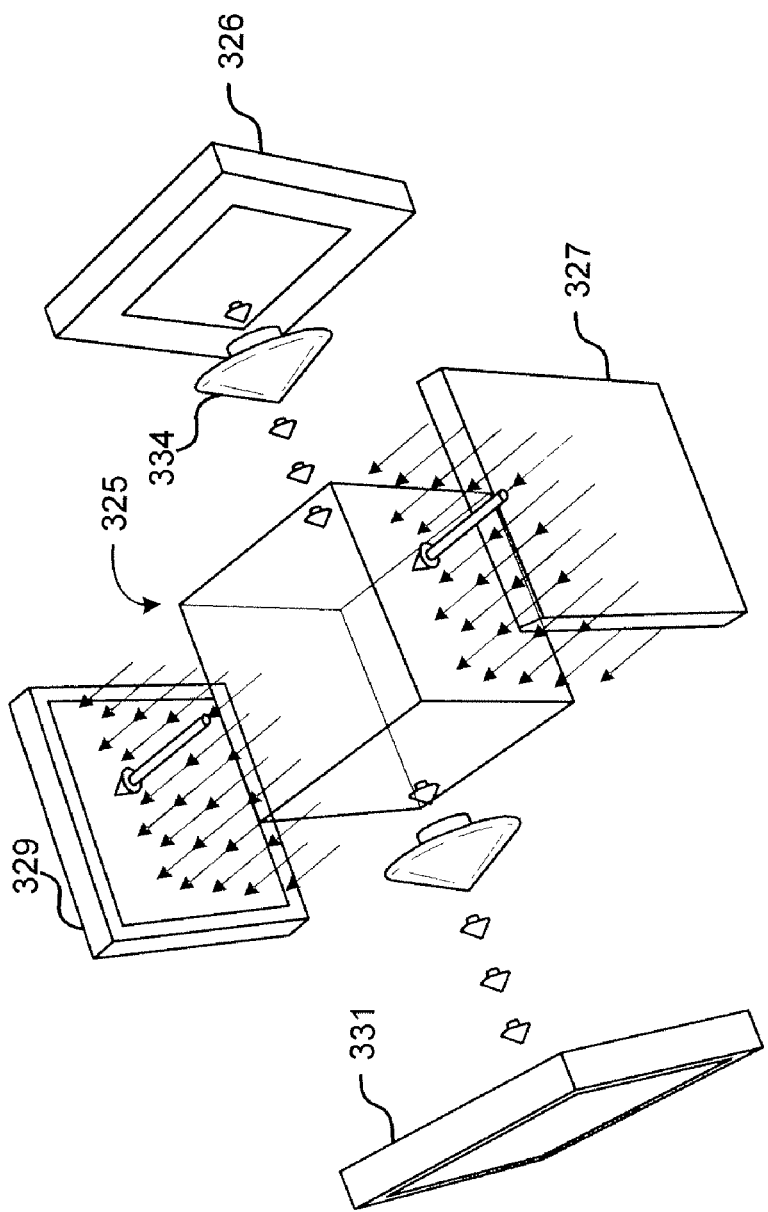
FIG. 6 is a diagram illustrating a perspective view of a holographic recording system in accordance with one embodiment of the invention.

FIG. 6 is a diagram illustrating a perspective view of a holographic recording and retrieval system in accordance with one embodiment of the invention. Referring now to FIG. 6, in this example implementation illustrates holographic recording media 325 which includes, for example, beam splitters lenses and the holographic recording crystal such as, for example, that illustrated in FIG. 5. This perspective view illustrates an example of how these components can be configured in a cubic or block arrangement and illustrates an example of their spatial relation to spatial light modulators 326, 327 and CCD/CMOS image sensors 329, 331. As this example illustrates, a data input spatial light modulator 326 provides an image (representing data or an object 334, for example) to be recorded in a frame or page of the holographic storage medium within recording media 325. This example also illustrates a spatial relationship between recording media 325 spatial light modulators 326, 327, and CCD image sensors 329, 331.

Figure 7:
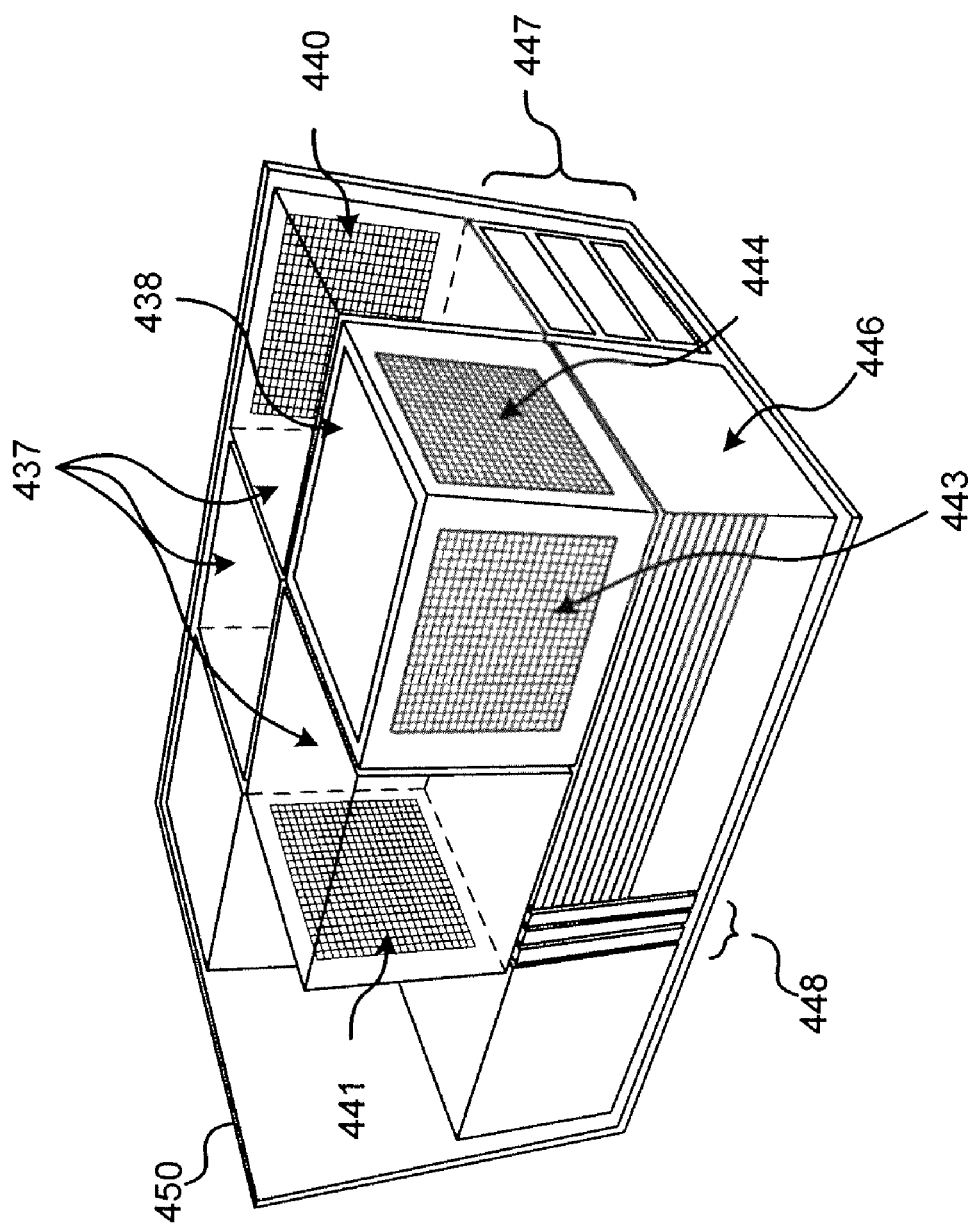
FIG. 7 is a diagram illustrating an example system package for deployment in accordance with one embodiment of the invention.

FIG. 7 is a diagram illustrating an example system package for deployment in accordance with one embodiment of the invention. This example illustrates three cubic polarizing beam splitters 437 arranged adjacent to the holographic storage medium, which in this example is a photo refractive crystal 438. This example also illustrates one embodiment for arrangement of data spatial light modulator positioned in proximity to the beam splitter/crystal arrangement, and an arrangement for a data CCD image sensor 443, and a correlation CCD image sensor 444. In this example, the laser 446, optics 448 and electronics 447 are housed in the casing 450 just below the beam splitter/mirror/crystal arrangement. Although not illustrated, control and image processing electronics can also be included within housing 450, as can appropriate power sources. However, other embodiments, utilize external processing capabilities and power sources. Using external control, processing, and power functionality can allow the recording module to be implemented in a small volume, low weight configuration. Accordingly, multiple recording modules can be interfaced to a single control and processing system to increase storage capacity.

Although not illustrated, heat spreaders can be added to the package to allow more uniform heat distribution across the components, thereby reducing thermal effects of the system. Index matching and antireflective coatings layers can be used to improve the optical performance of the system where multiple components are integrated such as being splitters, lenses, heat spreaders, and other optical components. Were necessary or useful, and are reflective coatings can also be utilized.

Although the components of a storage module such as those illustrated in the examples above can be scaled according to the desired specifications and applications, one example system is now described. As would be apparent to one of ordinary skill in the art after reading this description other components and arrangements can be utilized to achieve desired system size, power consumption and resolution parameters. In this example, the recording module utilizes small cubes of polarizing beamsplitters on the order of 1-1.5 mm$^3$. The beam splitters can be glued together with high speed 1-4 kHz frame rate, high-resolution image sensors such as, for example, 1024×1024 reflective, CMOS-backplane ferroelectric spatial light modulators for a 2-D data or other object input. In this example, a medium resolution (e.g., 128×128) high-speed (1-4 kHz frame rate) orthogonal binary phase-only CMOS-backplane FLC-SLM can be used for phase array reference beam generation. The image sensor can be implemented using two high-resolution (1024×1024) high-speed (1-4 kHz) CMOS or other CCD sensor arrays. One can be used for 2-D page read-out and the other for correlation signal detection with associated memory read-out. The laser can be implemented using a moderate power (<1 W) compact green laser at 532 nm (e.g., a frequency doubled Nd:YAG solid-state laser) for both hologram recording and read-out. Additionally an additional low-power HeNe laser diode may be included for two-photon rewritable hologram recording). This example can also use an approximately 1 cm cube suitably doped lithium niobate (LiNbO3) crystal for 90°-geometry volume hologram recording. Flat holographic optical element (HOE) lenses can be used for laser beam collimation and for spatial-light modulator to CMOS/CCD imaging, along with thin polarization optics (½λ and ¼λ plates) and shutters for object and reference beams. The spatial-light-modulator and CMOS drivers and control electronics can also be integrated into a compact (4.5×4.5×3 cm≈60 cm$^3$) volume inside a ruggedized and thermally controlled (EMI shielded) metallic module. The input and output data are connected via a standard high-speed/parallel data bus interconnection for interfacing to existing instrumentation.

The configuration into solid cube optics with no air gaps provides a highly stable configuration supported by optically gluing the components and mounting in a strengthened and hardened by mechanical frame. In accordance with this example, the entire module can be on the order of 4.5 cm×4.5 cm×3 cm. With a glass density of ~2.5 g/cm$^3$, the optical module in such an example will weigh less than 100 g. With the laser and electronics as well as the mechanical casing and connectors, the total weight of the module in such an example configuration can weigh less than 500 g.

Using a single laser, both recording and readout of the holograms can be made via compact (~1 mm flat) HOE lenses, with 1:1 image relationship between the input data spatial light modulator to the readout image sensor array, and the reference beam spatial light modulator to the correlation image sensor array. This symmetric configuration allows the module to have a cubic monolithic structure. Using such a configuration, a holographic recording system can be implemented to have a high survivability rate for onboard applications. Further, because of the use of solid-state laser and CMOS-backplane spatial light modulators and sensors, the electrical power consumption can be small (<10 watts), allowing the system to operate with standard 12 V/24 V DC onboard power sources.

Embodiments that perform recording and read out using a collinear binary phase encoded orthogonal reference wave, can be implemented to take advantage of the concept that an arbitrary wavefront of an object can be decomposed into plane waves, each of which is recorded and read out independently. That is, a wavefront that is the sum of N plane waves can be represented as N orthogonal eigenfunctions, i.e., modes $\psi_n$. Each of these modes can be made to pass independently through a 3D hologram as if through an optically uniform medium and does not change its form. In mathematical terms, this means that a self-conjugate operator H having N eigenfunctions $\psi_n$, can be compared to a 3D hologram. When reading out with a specific eigenfunction (which has been used as a reference wave in multiple recording), orthogonality nullifies all the reconstructed object waves except the one used in recording with that reference wave.

Square array phase patterns can form an orthogonal set of plane waves if the total area of positive (phase 0) and negative (phase π) regions are equal. FIG. 3A illustrates an example set of orthogonal binary phase patterns (Walsh functions, in this example). FIG. 3B illustrates an example for generating an orthogonal function optically by using a commercially available spatial light modulator in accordance with one embodiment of the invention. One example of a spatial light modulator is a Binary Phase only spatial light modulator from Boulder Nonlinear Systems, Inc., or from Brillian Corp.).

Hologram multiplexing using collinear phase-encoded speckle reference waves can be used, but may result in noise (e.g., due to crosstalk) and a need for critical registration in the read out. These drawbacks are due to the use of a random set (rather than an orthogonal set) of reference waves. In preferred embodiments, using a large thickness of the holograms and the consequent high angular selectivity, the two adjacent regions on a phase pattern are recorded independently without substantial crosstalk.

Some embodiments are configured to perform multiplexing and addressing with collinear (e.g., same direction) reference beams, which form an orthogonal set of binary phase-encoded 2D array patterns. The number of orthogonal patterns, N, can be very large (for an n×n array, $N=n!/((n/2)!)^2$). Therefore, multiplexibility can be high, but may be limited by the maximum achievable index modulation of the material. The hologram can be recorded as the spatial interference pattern between a binary phase-encoded reference beam from the phase spatial light modulator and an object beam from the data spatial light modulator representing a 2D bit-map ("page") of data. With orthogonal reference functions, the recording can be repeated at the same location, i.e., multiplexed, by using other binary-phase patterns belonging to the same orthogonal set. Using a phase spatial light modulator with 32×32 pixels (i.e., n=32), $N=32!/(16!)^2=6\times10^8$, number of holograms can be achieved. With a 1024×1024 pixel data page (~$10^6$ bits), a data capacity of $6\times10^{14}$ bits or 600 Tbits (75 Tbytes) in 1 cm$^3$ crystal can be achieved. With higher resolution spatial light modulators, even greater storage capacities can be achieved.

As previously noted, embodiments of the invention use a symmetric 90° recording and retrieving geometry and parallel holographic correlation search without requiring any movement of the recording medium. The 90° holographic recording geometry allows improved filtering of the noise signal and provides a high signal-to-noise ratio in the holograms over other configurations.

Additionally, embodiments can be implemented to utilize a highly parallel holographic associative search with a partial image data key (i.e., context addressing mode). This allows simultaneous retrieval of all correlated signals corresponding to possible data pages of which the key forms a part. In this case, the correlation signals are processed in real-time to identify the right data image and retrieve the full data page from memory in a few milliseconds. For example, with a 1024×1024 pixel data page with an update speed of 10 kHz, achievable with current spatial light modulators (SLMs) such as the Texas Instruments Digital Micromirror Device (DMD), a data transfer rate of 10 gigabit/s is achievable.

In one embodiment, the system is configured as a modular system such that components can be removed/replaced. For example, in one embodiment the recording crystal can be removed/inserted. This modular nature of the recording medium facilitates replacement of the media as well as transfer of the data.

Various embodiments described above utilized a nonscarming orthogonal phase reference-beam addressing technique that allows a plurality of different reference beams, and thus a corresponding number of 2D hologram pages, to be stored in the volume of the recording crystal. Accordingly, embodiments of the invention can be implemented so as to overcome limitations of standard angular multiplexed (scanned) holographic recording in which the maximum number of hologram pages are limited by the angular resolution and the 2D surface area of the recording crystal. For example, with a 1024×1024≈$10^6$ binary pixel spatial light modulator, and $10^6$ or $10^8$ reference codes, the total data storage capacity can reach $10^6 \times 10^6$ or $10^6 \times 10^8$ or $10^{12}$ to $10^{14}$ terabits/cm$^3$.

The orthogonal binary phase array pattern preferably uses o, π phases to provide orthogonality. With currently available spatial light modulators, the Walsh functions or other phase codes can be generated at high-speed (1-4 kHz) so that 2D data can be accessed at 1 to 4 Gbits/s rate. The use of a phase-coded reference read-out beam can also provide secured access to the stored data, as the data cannot be retrieved without access to the orthogonal functions used to write the data.

Figure 8:
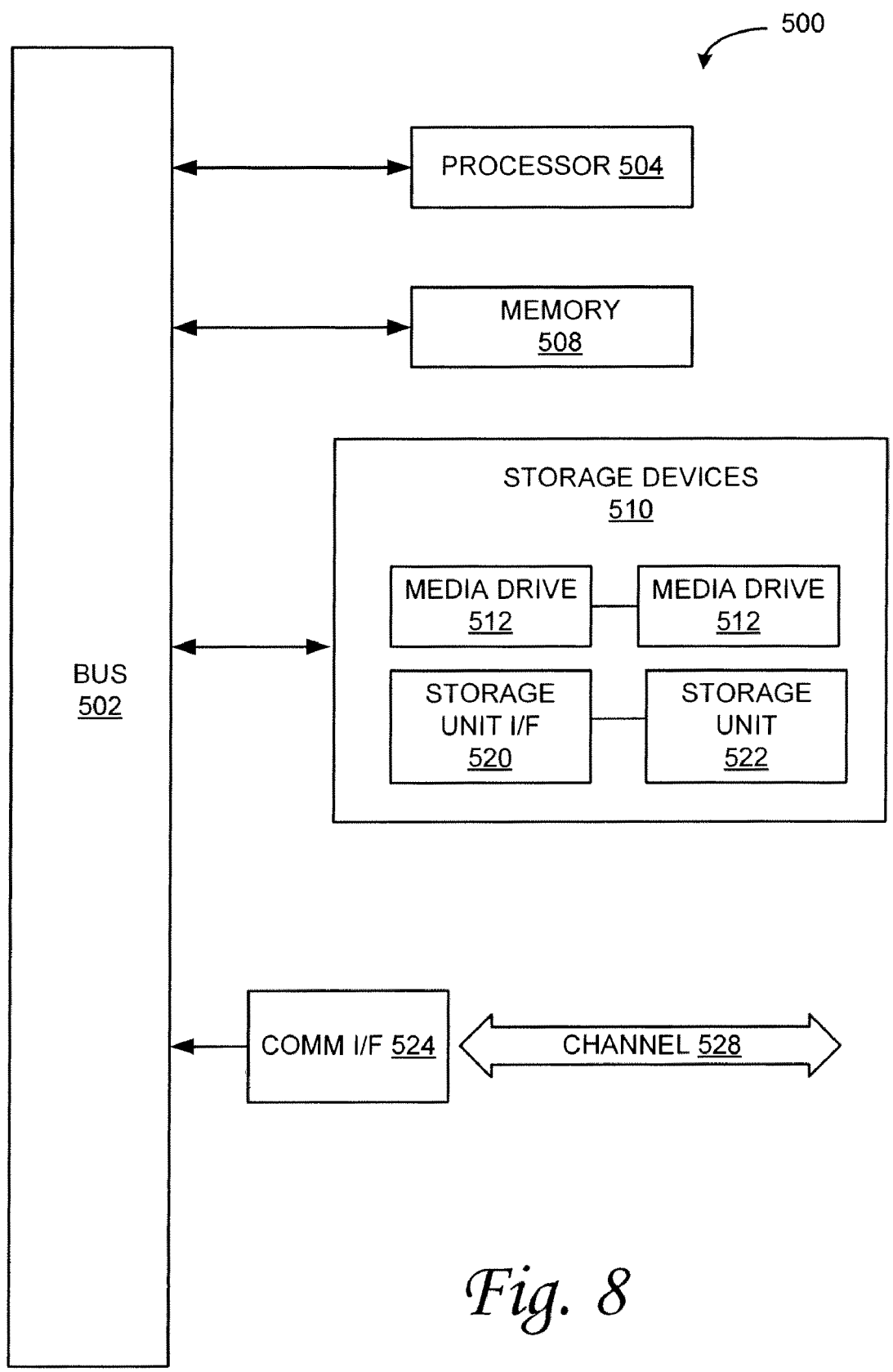
FIG. 8 illustrates an example computing module that may be used in implementing various features of embodiments of the invention.

Control and other electronics described herein can be implemented utilizing any form of hardware, software, or a combination thereof. For example, one or more processors, controllers, ASICs, PLAs, PALs, CPLDs, FPGAs, logical components, software routines or other mechanisms might be implemented to make up a module. In implementation, the various modules described herein might be implemented as discrete modules or the functions and features described can be shared in part or in total among one or more modules. In other words, as would be apparent to one of ordinary skill in the art after reading this description, the various features and functionality described herein may be implemented in any given application and can be implemented in one or more separate or shared modules in various combinations and permutations. Even though various features or elements of functionality may be individually described or claimed as separate modules, one of ordinary skill in the art will understand that these features and functionality can be shared among one or more common software and hardware elements, and such description shall not require or imply that separate hardware or software components are used to implement such features or functionality.

Where components or modules of the invention are implemented in whole or in part using software, in one embodiment, these software elements can be implemented to operate with a computing or processing module capable of carrying out the functionality described with respect thereto. One such example computing module is shown in FIG. 8. Various embodiments are described in terms of this example-computing module 500. After reading this description, it will become apparent to a person skilled in the relevant art how to implement the invention using other computing modules or architectures.

Referring now to FIG. 8, computing module 500 may represent, for example, computing or processing capabilities found within desktop, laptop and notebook computers; handheld computing devices (PDA's, smart phones, cell phones, palmtops, etc.); mainframes, supercomputers, workstations or servers; or any other type of special-purpose or general-purpose computing devices as may be desirable or appropriate for a given application or environment. Computing module 500 might also represent computing capabilities embedded within or otherwise available to a given device. For example, a computing module might be found in other electronic devices such as, for example, digital cameras, navigation systems, cellular telephones, portable computing devices, modems, routers, WAPs, terminals and other electronic devices that might include some form of processing capability.

Computing module 500 might include, for example, one or more processors, controllers, control modules, or other processing devices, such as a processor 504. Processor 504 might be implemented using a general-purpose or special-purpose processing engine such as, for example, a microprocessor, controller, or other control logic. In the illustrated example, processor 504 is connected to a bus 502, although any communication medium can be used to facilitate interaction with other components of computing module 500 or to communicate externally.

Computing module 500 might also include one or more memory modules, simply referred to herein as main memory 508. For example, preferably random access memory (RAM) or other dynamic memory, might be used for storing information and instructions to be executed by processor 504. Main memory 508 might also be used for storing temporary variables or other intermediate information during execution of instructions to be executed by processor 504. Computing module 500 might likewise include a read only memory ("ROM") or other static storage device coupled to bus 502 for storing static information and instructions for processor 504.

The computing module 500 might also include one or more various forms of information storage mechanism 510, which might include, for example, a media drive 512 and a storage unit interface 520. The media drive 512 might include a drive or other mechanism to support fixed or removable storage media 514. For example, a hard disk drive, a floppy disk drive, a magnetic tape drive, an optical disk drive, a CD or DVD drive (R or RW), or other removable or fixed media drive might be provided. Accordingly, storage media 514 might include, for example, a hard disk, a floppy disk, magnetic tape, cartridge, optical disk, a CD or DVD, or other fixed or removable medium that is read by, written to or accessed by media drive 512. As these examples illustrate, the storage media 514 can include a computer usable storage medium having stored therein computer software or data.

In alternative embodiments, information storage mechanism 510 might include other similar instrumentalities for allowing computer programs or other instructions or data to be loaded into computing module 500. Such instrumentalities might include, for example, a fixed or removable storage unit 522 and an interface 520. Examples of such storage units 522 and interfaces 520 can include a program cartridge and cartridge interface, a removable memory (for example, a flash memory or other removable memory module) and memory slot, a PCMCIA slot and card, and other fixed or removable storage units 522 and interfaces 520 that allow software and data to be transferred from the storage unit 522 to computing module 500.

Computing module 500 might also include a communications interface 524. Communications interface 524 might be used to allow software and data to be transferred between computing module 500 and external devices. Examples of communications interface 524 might include a modem or softmodem, a network interface (such as an Ethernet, network interface card, WiMedia, IEEE 802.XX or other interface), a communications port (such as for example, a USB port, IR port, RS232 port Bluetooth® interface, or other port), or other communications interface. Software and data transferred via communications interface 524 might typically be carried on signals, which can be electronic, electromagnetic (which includes optical) or other signals capable of being exchanged by a given communications interface 524. These signals might be provided to communications interface 524 via a channel 528. This channel 528 might carry signals and might be implemented using a wired or wireless communication medium. Some examples of a channel might include a phone line, a cellular link, an RF link, an optical link, a network interface, a local or wide area network, and other wired or wireless communications channels.

In this document, the terms "computer program medium" and "computer usable medium" are used to generally refer to media such as, for example, memory 508, storage unit 520, media 514, and channel 528. These and other various forms of computer program media or computer usable media may be involved in carrying one or more sequences of one or more instructions to a processing device for execution. Such instructions embodied on the medium, are generally referred to as "computer program code" or a "computer program product" (which may be grouped in the form of computer programs or other groupings). When executed, such instructions might enable the computing module 500 to perform features or functions of the present invention as discussed herein.

While various embodiments of the present invention have been described above, it should be understood that they have been presented by way of example only, and not of limitation. Likewise, the various diagrams may depict an example architectural or other configuration for the invention, which is done to aid in understanding the features and functionality that can be included in the invention. The invention is not restricted to the illustrated example architectures or configurations, but the desired features can be implemented using a variety of alternative architectures and configurations. Indeed, it will be apparent to one of skill in the art how alternative functional, logical or physical partitioning and configurations can be implemented to implement the desired features of the present invention. Also, a multitude of different constituent module names other than those depicted herein can be applied to the various partitions. Additionally, with regard to flow diagrams, operational descriptions and method claims, the order in which the steps are presented herein shall not mandate that various embodiments be implemented to perform the recited functionality in the same order unless the context dictates otherwise.

Although the invention is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the invention, whether or not such embodiments are described and whether or not such features are presented as being a part of a described embodiment. Thus, the breadth and scope of the present invention should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

The invention claimed is:

1. A holographic storage apparatus, comprising:
a polarizing beam splitter configured to split an incoming beam into an object beam and a reference beam;
a first spatial light modulator configured to modulate the object beam with an array of data;
a second spatial light modulator configured to phase modulate the reference beam with an orthogonal phase function;
a holographic medium configured to record an interference pattern between the modulated object beam and the modulated reference beam;
a first image sensor configured to read an image of the modulated object beam; and
a second image sensor configured to read an image of the modulated reference beam.

2. The apparatus of claim 1, wherein the first spatial light modulator is configured to amplitude modulate the object beam with the array of data.

3. The apparatus of claim 2, wherein the data array is a two dimensional array of data and the reference beam is a two dimensional orthogonal phase function.

4. The apparatus of claim 3, wherein the first spatial light modulator is configured to modulate a light beam with a portion of the array of data and wherein the second image sensor is configured to read an image formed when the modulated light beam impinges on the holographic medium and further comprising a processor configured to determine the orthogonal phase function used to record the hologram with the modulated object beam.

5. The apparatus of claim 4, wherein the first and second spatial light modulators are reflection spatial light modulators and further comprising:
a second polarizing beam splitter configured to reflect the object beam onto the first spatial light modulator and to transmit the modulated object beam;
a third polarizing beam splitter configured to reflect the reference beam onto the second spatial light modulator and to transmit the modulated reference beam.

6. The apparatus of claim 5, wherein the first polarizing beam splitter, the second polarizing beam splitter, and the third polarizing beam splitter comprise solid optic components.

7. The apparatus of claim 6,
wherein the first polarizing beam splitter is fixedly coupled to the second polarizing beam splitter and the third polarizing beam splitter and the holographic medium is fixedly coupled to the second polarizing beam splitter and the third polarizing beam splitter such that the first polarizing beam splitter, the second polarizing beam splitter, the third polarizing beam splitter, and the holographic medium form quadrants of a rectangular prism;
wherein the first spatial light modulator is fixedly coupled to a first face of the second polarizing beam splitter and the first image sensor is fixedly coupled to a first face of the holographic medium that opposes the first face of the second polarizing beam splitter; and wherein the second spatial light modulator is fixedly coupled to a first face of the third polarizing beam splitter and the second image sensor is fixedly coupled to a second face of the holographic medium that opposes the first face of the third polarizing beam splitter.

8. The apparatus of claim 7, further comprising a heat spreader configured to distribute heat.

9. The apparatus of claim 1, wherein the modulated object beam and the modulated reference beam are polarized in a direction orthogonal to an optical plane when forming the interference pattern.

10. The apparatus of claim 1, wherein the holographic medium comprises an erasable holographic medium, and a further comprising a laser configured to generate an erasing light beam configured to erase the erasable holographic medium.

11. A method for holographic data storage and retrieval, comprising:

performing a holographic data storage method comprising:
 modulating an object beam with a two dimensional array of data;
 modulating a first reference beam with a two dimensional orthogonal phase function;
 recording an interference pattern formed between the modulated object beam and the modulated reference beam in a holographic medium; and performing a holographic data retrieval method comprising:
 modulating a light beam with a portion of the two dimensional array of data to determine the orthogonal phase function used to record the modulated reference beam; and
 modulating a second reference beam with the determined orthogonal phase function to determine the two dimensional array of data.

12. The method of claim 11, wherein the object beam is amplitude modulated with the two dimensional array of data.

13. The method of claim 12, wherein the method of data storage further comprises:
 splitting an incoming beam using a first polarizing beam splitter to form the object beam and the reference beam;
 reflecting the object beam off of a first spatial light modulator to modulate the object beam; and
 reflecting the reference beam off of a second spatial light modulator to modulate the reference beam.

14. The method of claim 13, further comprising adjusting the polarity of the incoming beam to adjust power of the reference beam and to adjust the power of the object beam.

15. Computer executable program code embodied on a computer readable medium configured to cause a holographic storage apparatus to perform the functions of:
 directing an incoming beam at a first polarizing beam splitter configured to split an incoming beam into an object beam and a reference beam;
 directing the object beam to reflect off of a first spatial light modulator to modulate the object beam with a two dimensional array of data;
 directing the reference beam to reflect off a second spatial light modulator to phase modulate the reference beam with an orthogonal phase function;
 recording an interference pattern formed between the modulated object beam and the modulated reference beam;
 recording an image of the modulated object beam formed when the modulated reference beam is transmitted through the holographic medium; and
 recording an image of the modulated reference beam formed when a light beam modulated with a portion of the two dimensional array of data is transmitted through the holographic medium.

16. The computer executable program code of claim 15, wherein the first spatial light modulator is configured to amplitude modulate the object beam with the array of data.

17. The computer executable program code of claim 16, further configured to cause the apparatus to perform the function of adjusting the polarity of the incoming beam to adjust the intensity of the reference beam and to adjust the intensity of the object beam.

18. The computer executable program code of claim 16, further configured to cause the apparatus to direct the object beam to a second polarizing beam splitter configured to reflect the object beam onto the first spatial light modulator and to transmit the modulated object beam; and to cause the apparatus to direct the reference beam to a third polarizing beam splitter configured to reflect the reference beam onto the second spatial light modulator and to transmit the modulated reference beam.

19. The computer executable program code of claim 18, wherein the first polarizing beam splitter, the second polarizing beam splitter, and the third polarizing beam splitter comprise solid optic components.

20. The computer executable program code of claim 19,
 wherein the first polarizing beam splitter is fixedly coupled to the second polarizing beam splitter and the third polarizing beam splitter and the holographic medium is fixedly coupled to the second polarizing beam splitter and the third polarizing beam splitter such that the first polarizing beam splitter, the second polarizing beam splitter, the third polarizing beam splitter, and the holographic medium form quadrants of a rectangular prism;
 wherein the first spatial light modulator is fixedly coupled to a first face of the second polarizing beam splitter and the first image sensor is fixedly coupled to a first face of the holographic medium that opposes the first face of the second polarizing beam splitter; and
 wherein the second spatial light modulator is fixedly coupled to a first face of the third polarizing beam splitter and the second image sensor is fixedly coupled to a second face of the holographic medium that opposes the first face of the third polarizing beam splitter.

* * * * *